United States Patent [19]
Pourian

[11] Patent Number: 5,499,853
[45] Date of Patent: Mar. 19, 1996

[54] POCKET PART FOR A VEHICLE DOOR

[76] Inventor: Reza R. Pourian, 25 Camphor Ct., Hills Borough, Calif. 94010

[21] Appl. No.: 295,404

[22] Filed: Aug. 25, 1994

[51] Int. Cl.⁶ ..................................... B60R 7/04
[52] U.S. Cl. ..................... 296/37.13; 296/152
[58] Field of Search ................. 296/31.7, 37.8, 296/37.13, 37.16, 152; 224/273, 277; 411/392, 400, 401, 482

[56] References Cited

U.S. PATENT DOCUMENTS

| | | | |
|---|---|---|---|
| 1,995,143 | 3/1935 | Burch | 296/37.13 |
| 2,802,297 | 8/1957 | Meyer | 411/482 |
| 4,619,477 | 10/1986 | Kneib et al. | 296/152 |
| 5,009,458 | 4/1991 | Shute | 296/37.13 |
| 5,261,716 | 11/1993 | Phelps | 296/37.8 |

*Primary Examiner*—Dean Kramer
*Attorney, Agent, or Firm*—William L. Fisher

[57] ABSTRACT

In a pocket part for a vehicle door constructed to be affixed to the interior structure of such door to form a vehicle door pocket having a U-shaped plastic frame, the frame having an elongate base and a pair of arms upstanding from the base and a pair of metal fasteners carried in the upper ends of the frame arms at the upper corners of the pocket part, the improvement comprising a single elongate metal strap slidable length-wise of the frame and having its opposite ends held by the heads, respectively, of the pair of fasteners, and a single elastic strap wrapped around opposite ends of the slidable strap and having its opposite ends held by the shanks, respectively of the pair of fasteners, the elastic strap being in constant tension so as to maintain the slidable strap in constant compression, whereby to maintain the upper edge of the pocket part biased against the interior door structure.

13 Claims, 4 Drawing Sheets

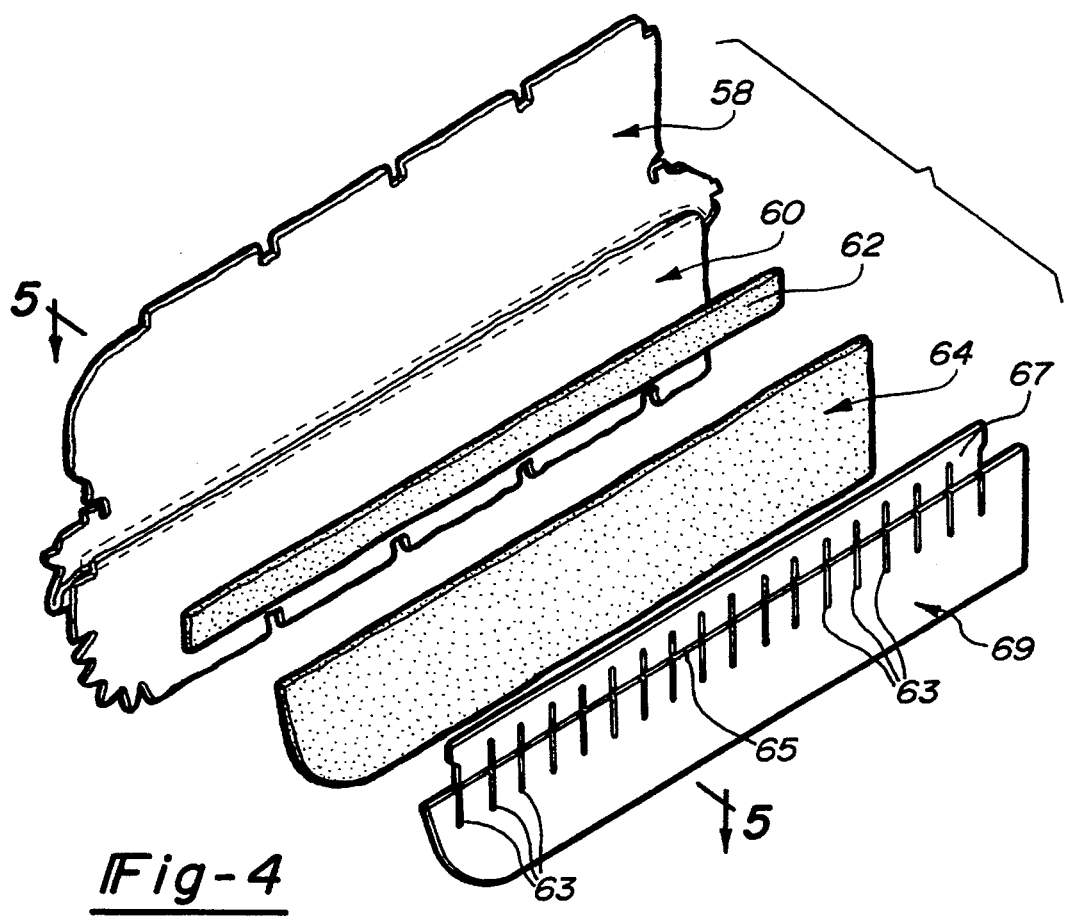
Fig-4
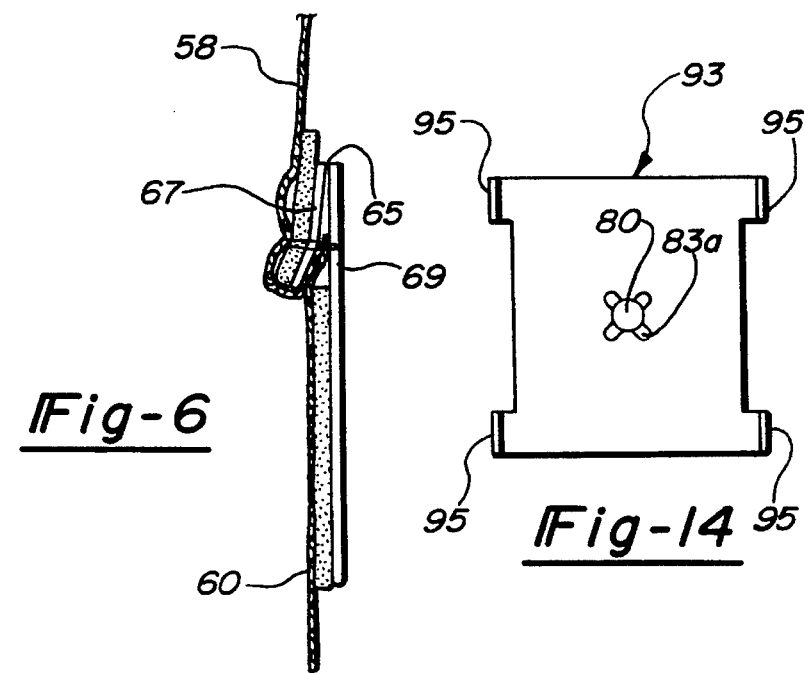
Fig-6
Fig-14 ns="1"># POCKET PART FOR A VEHICLE DOOR

My invention relates to a pocket part for a vehicle door.

The principal object of my invention is to provide improvement in a pocket part for a vehicle door which enhance the function and appearance thereof while reducing the cost of manufacture and assembly thereof. More specifically, my invention improves upon the pocket part for a vehicle door shown in U.S. Pat. No. 5,261,716 issued on Nov. 16, 1993 to Chivas Products Limited.

The left hand end of the pocket part 24 shown in FIG. 1 of the Chivas patent has a deep opening therein on account of the way it is wrapped and the use of the elastic strip 98 (FIG. 2) and the flap 94 (FIG. 2). If the hand 104 shown in FIG. 4 were to be inserted into the opening in said left end, it would sink in so that all four fingers and the palm would be buried up to the thumb. This opening which is referred to in the trade as a "rat-hole" is very unsightly, to say the least. It is not mentioned or referred to at all in the Chivas patent. Incidentally, the door 10 shown in FIG. 1 of the Chivas patent is a left hand door shown with a right hand pocket part affixed thereto by mistake. The radiused end of the pocket part should be at the left side of the door 10 in said FIG. 1.

The foregoing object of my invention will become apparent during the course of the following description, taken in conjunction with the accompanying drawings, in which:

FIG. 4 is an exploded view in perspective showing elements of said pocket part;

FIG. 6 is a fragmentary vertical sectional view of certain structure of FIG. 5 taken on the line 6—6 thereof;

FIGS. 10–14 are different views of other elements used in said pocket part.

Figure 1:
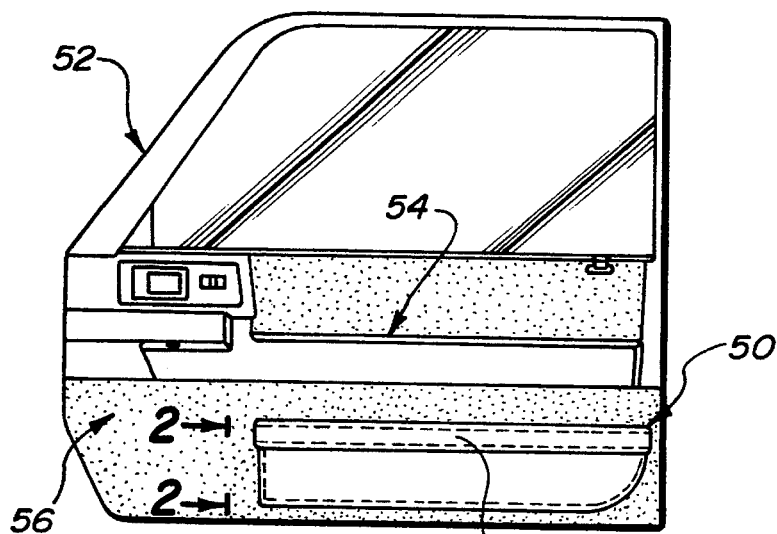
FIG. 1 is a front elevational view of a vehicle door from the inside thereof shown equipped with a vehicle door pocket embodying the pocket part for a vehicle door that I have invented.
Figure 2:
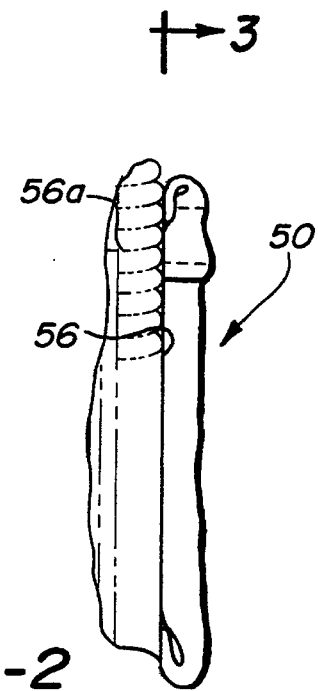
FIG. 2 is an end elevational view of said door pocket taken on the line 2—2 of FIG. 1.
Figure 3:
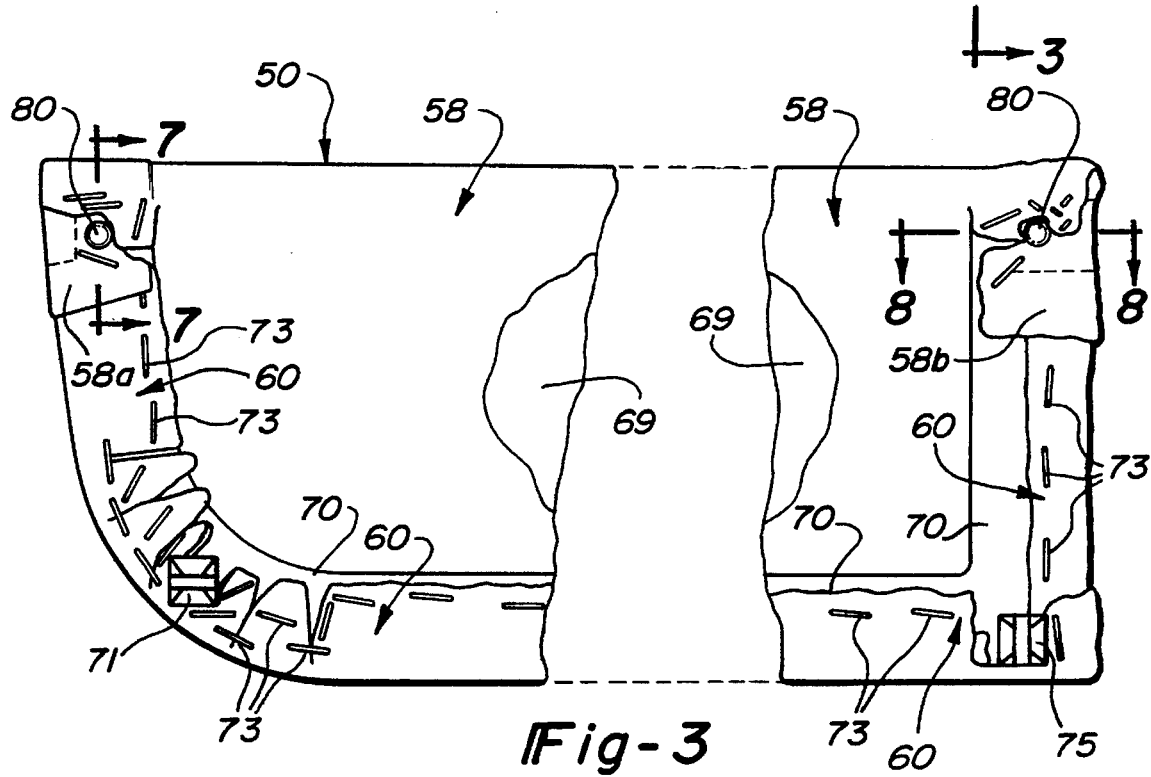
FIG. 3 is a rear elevational view of said pocket part.
Figure 7:
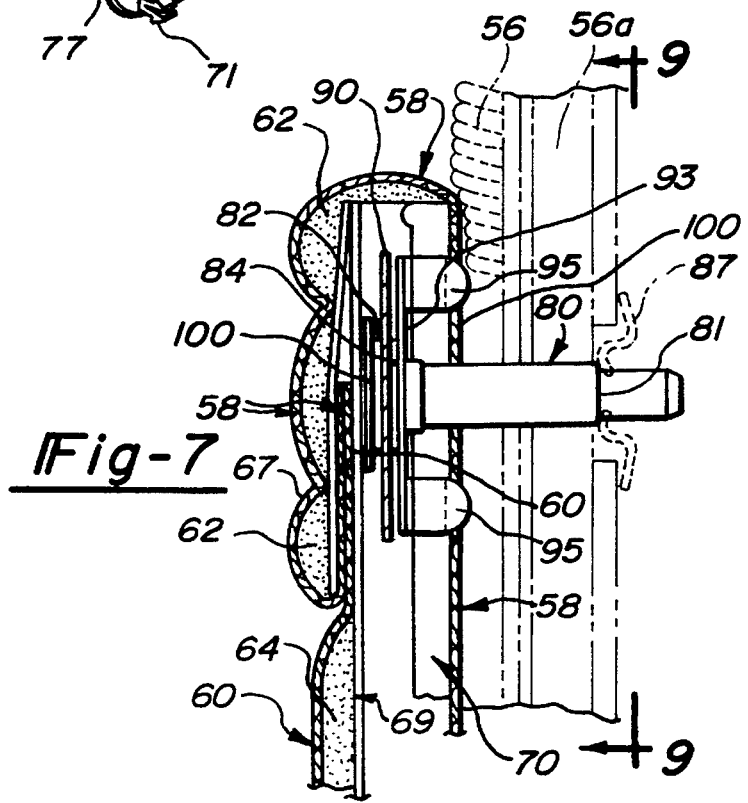
FIG. 7 is a vertical sectional view of the structure of FIG. 3 taken on the line 7—7 thereof.

Referring to the drawings in greater detail, 50 designates said pocket part shown affixed to the interior of a vehicle door 52 beneath the arm rest 54 thereof and against a carpeted area designated 56. The carpeted area 56 forms a rigid inner wall for the vehicle door pocket while my pocket part 50 forms the flexible and moveable outer wall of said vehicle door pocket. The vinyl wrap that I provide for the pocket part 50 is in two sections 58 and 60. The bottom edge of the wrap 58 and the upper edge of the wrap 60 are sewn together (finished face against finished face) between two portions 67 and 69 of a cardboard foundation member as shown in FIGS. 6 and 7. The upper low height portion 67 of the cardboard foundation member is permanently hinged to the lower higher height portion 69. A plurality of spaced apart vertical slits 63 are provided in the two portions 67 and 69 which traverse the hinge line 65 to facilitate the 180 degree bending between the two portions 67 and 69. As shown in FIGS. 3, 6 and 7, the wrap 58 is extended first upwardly and then downwardly (providing thereby most of the covering for the backside of the pocket part 50). Ears 58a and 58b are provided at opposite ends of the wrap 58 so as to wrap around the upper corners (both downwardly and inwardly as shown in FIG. 3) at the backside of the pocket part 50. A short height sheet of foam plastic 62 and a higher height sheet of plastic foam 64 are used for padding for the pocket part 50. The sheet 62 is sewn between the raw face of the wrap 58 and the portion 67 of the foundation member as shown in FIGS. 6 and 7. The sheet 64 is sewn between the raw face of the wrap 60 and the portion 69 of the foundation member as shown in FIGS. 6 and 7. The wrap 60 is extended first downwardly and then (at the perimeter portion thereof) upwardly and inwardly at the backside of the pocket part 50 (as shown in FIG. 3) where it is stapled, via a plurality of staples 73, to the backside of a generally U-shaped solid plastic frame 70. The frame 70 consists of an elongated horizontal bar (provided with a plurality of rearwardly projecting integrally formed fasteners 71, 75) having upstanding therefrom at opposite ends thereof a pair of arms 77, 79. The frame 70 is radiused at the end thereof where the arm 77 joins the horizontal bar which accounts for the radiused end of the pocket part 50 at the right end thereof as shown in FIG. 1.

Figure 5:
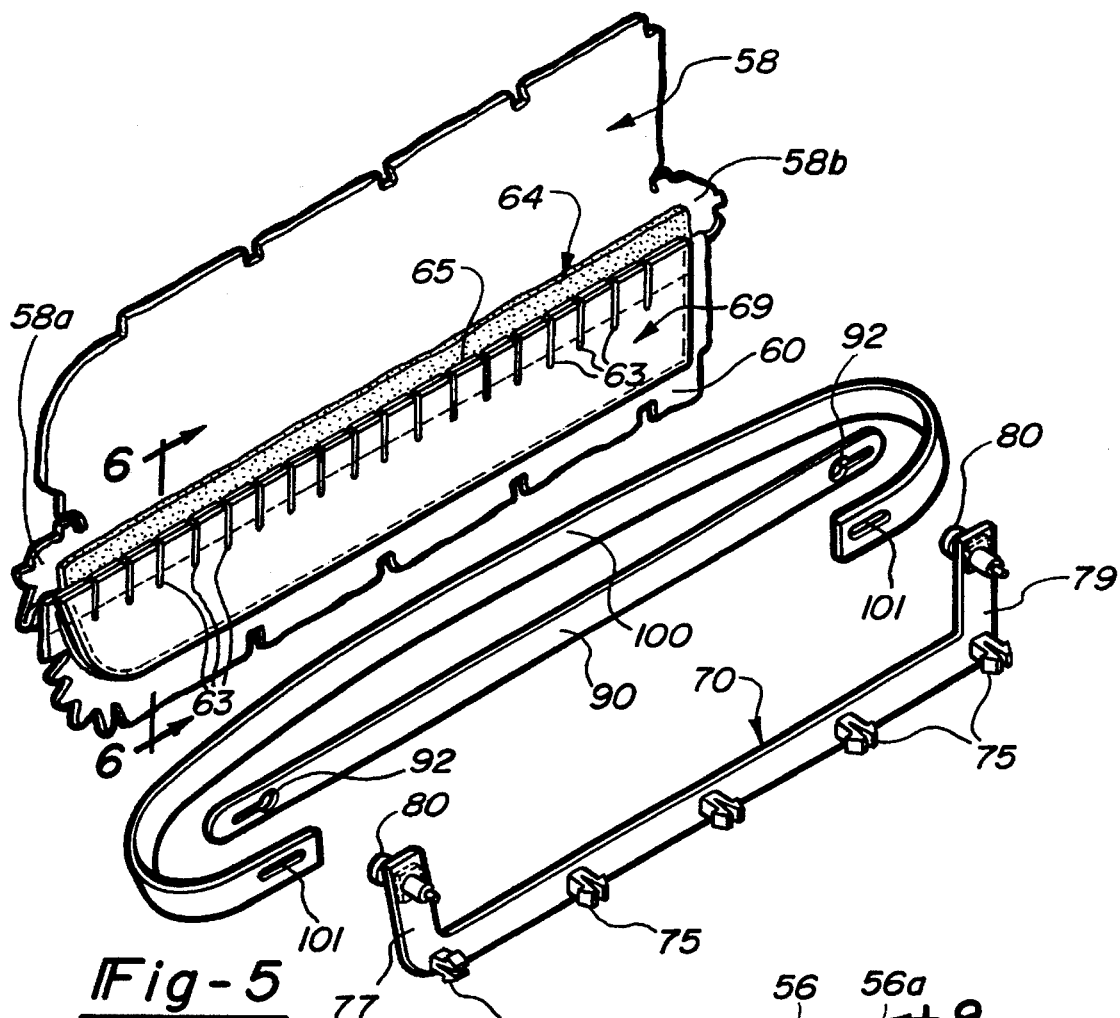
FIG. 5 is a similar view showing further elements of said pocket part.
Figure 8:
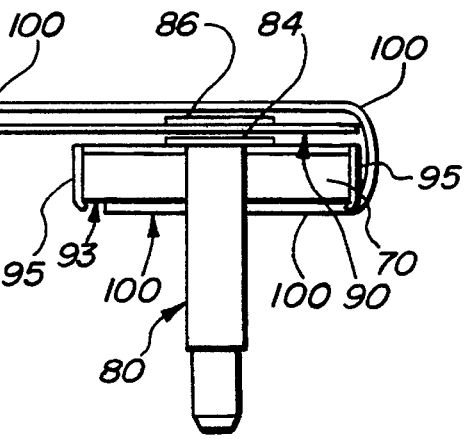
FIG. 8 is a horizontal sectional view of the structure of FIG. 3 taken on the line 8—8 thereof; certain parts have been removed for clarity of showing.
Figure 10:
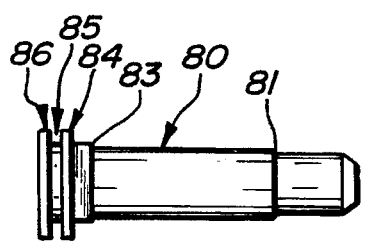
Figure 9:
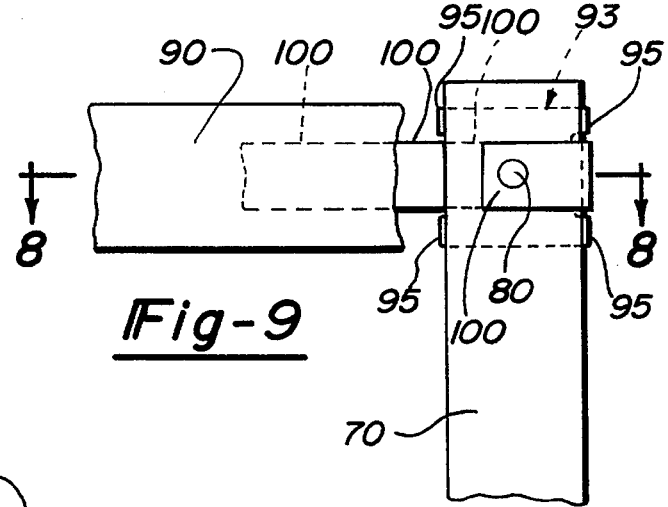
FIG. 9 is a vertical sectional view of the structure of FIG. 7 taken on the line 9—9 thereof; parts being shown in elevational view for clarity of showing.
Figure 11:
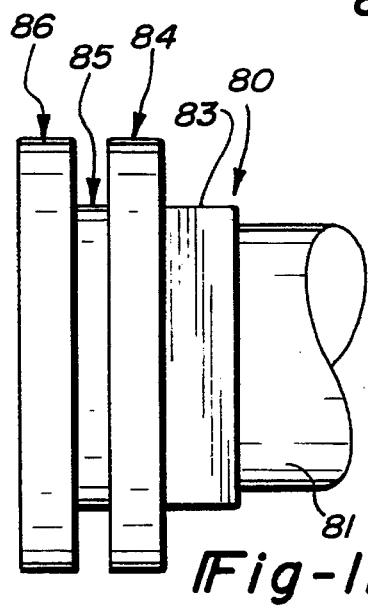
Figure 12:
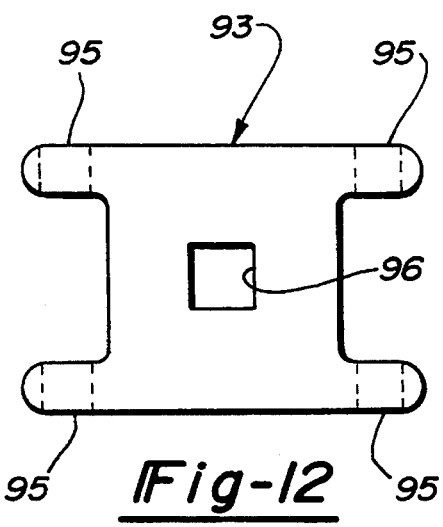
Figure 13:
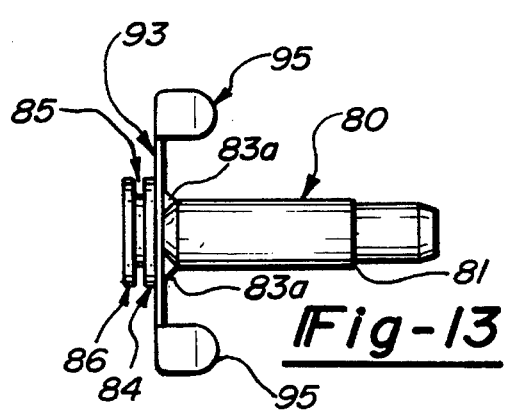

The upper corners of the pocket part 50 are provided with a pair of specially designed double-headed metal fasteners 80 which are carried, respectively, in the upper ends of the arms 77, 79. The double heads of each fastener 80 are designated 84, 86 while the space therebetween is designated 85. Ahead of the head 84 a shoulder 83 is provided that has a square cross-section to match a square cross-section aperture 96 provided in a metal retention clip 93 that forms a subassembly with a respective fastener 80 as shown in FIG. 13. The shoulder 83 is swaged against the front face of the respective retention clip 93 as shown and indicated at 83a in FIG. 14. The matching square cross-sections, as mentioned, and the swaging at 83a hold the rentention clip 93 and the respective fastener 80 fast against rotation relative to each other. The shank of each fastener 80 projects through the different layers of the wrap 58 and outwardly of the backside of the pocket part 50 as shown in FIG. 7 and through the carpeted area 56 and the door panel structure 56a immediately behind the carpeted area 56 where a Pal-nut (a trademark) 87 is threaded onto the free end of such shank up to a shoulder 81 provided thereon as shown in FIG. 7. Each retention clip 93 is provided with four ears 95 at the four corners thereof which are double bent so as to snap unto the opposite vertical surfaces of the upstanding arms 77, 79 on the frame 70 and hold the respective fastener 80 against rotation while the Pal-nut 87 is being threadably driven onto the free end of the shank thereof. A single slidable metal strap 90 having oppositely directed keyhole slots 92 formed in opposite ends thereof is provided to effect movement of the pocket part 50 outwardly of the carpeted area 56 during insertion (or removal) of a map (or other object) into (or from) the vehicle door pocket formed by said pocket part 50. The circular portions of the keyhole slots 92 allow the heads 86 on the pair of fasteners 80 to pass therethrough, respectively, so the fasteners 80 are able to permanently capture and hold the strap 90 during its slidable movement inside of the pocket part 50. The horizontal slotted portions of the keyhole slots 92 travel in the spaces 85, respectively, between the heads 84 and 86 on the pair of fasteners 80. The slidable strap 90 is permanently held in compression by forces applied to opposite ends thereof by a single elastic strap 100 which encircles the slidable strap 90 as shown in FIG. 5. The free ends of the elastic strap 100 are provided with elongated slots 101 therein through which the shanks of the pair of fasteners 80 project. Such free ends and slots 101 therein of the elastic strap 100 are shown disposed in front of the frame 70 in FIG. 5 for purposes of clarity of showing. However, in final assembly of the pocket part 50, such free ends and slots 101 therein are disposed behind the frame 70 with the shanks of the pair of fasteners 80 projecting through the slots 101. The elastic strap 100 is thus held in permanent tension, whereby to permanently compress the opposite ends of the slidable strap 90 as the elastic strap 100 wraps therearound as shown in FIGS. 8 and 9. Compression of the slidable strap 90 causes it to bow at the center thereof toward the carpeted area 56 so as to maintain the upper portion (the portion that is double-stitched as shown and indicated at 51 in FIG. 1) yieldably biased toward a closed position for the vehicle door pocket provided by the pocket part 50. It is this portion 51 which is gripped manually and pulled outwardly from the carpeted area 56 to open the vehicle door pocket and which returns of its own accord tc the normally closed position for the vehicle door pocket (all under force of the slidable strap 90 being under compression by the tension applied to the elastic strap 100 by its being stretched and held, via the slots 101 in the opposite ends thereof, by the shanks of the pair of fasteners 80).

It will thus be seen that there has been provided by my invention improvements in a pocket part for a vehicle door in which the object hereinabove set forth has been achieved. While a preferred embodiment of my invention has been shown and described, it is to be understood that variations and changes may be resorted tc without departing from my invention as defined by the appended claims.

What I claim is:

1. In a pocket part for a vehicle door constructed to be affixed to the interior structure of such door to form a vehicle door pocket having a U-shaped plastic frame, said frame having an elongate base and a pair of arms upstanding from said base and a pair of metal fasteners carried in the upper ends of said frame arms at the upper corners of said pocket part, the improvement comprising a single elongate metal strap slidable lengthwise of the frame and having its opposite ends held by the heads, respectively, of the pair of fasteners, and a single elastic strap wrapped around the opposite ends of the slidable strap and having its opposite ends held by the shanks, respectively, of the pair of fasteners, the elastic strap being in constant tension so as to maintain the slidable strap in constant compression, whereby to maintain the upper edge of the pocket part biased against said interior door structure.

2. The improvement in a pocket part for a vehicle door as claimed in claim 1 further comprising a double head on each fastener and a pair of oppositely directed keyhole slots in the opposite ends of the slidable strap, the slidable strap held on the fasteners by the slots therein being disposed, respectively, in spaces between the two heads on each fastener.

3. The improvement in a pocket part for a vehicle door as claimed in claim 1 further comprising a metal retention clip held fast to each fastener, each retention clip having means thereon for affixing itself to an arm of said frame to prevent rotation of the respective fastener when a nut is threaded on the free end thereof.

4. The improvement in a pocket part for a vehicle door as claimed in claim 1 having a foundation member of stiffened material which extends over the width of the pocket part from left to right thereof, said foundation member being formed in two parts one above the other which are permanently joined to each other along a horizontal hinge line, the lower part being of greater height than the upper part, and a plurality of spaced apart vertical slits cut through the two parts across said hinge line to facilitate bending thereof relative to each other, the two parts being bent substantially 180 degrees relative to each other and held in this position in final assembly of said pocket part.

5. The improvement in a pocket part for a vehicle door as claimed in claim 4 further comprising two wraps of vinyl having ends thereof extending over the width of the pocket part from left to right thereof, said two ends being pressed together finish face against finish face and being sewn in place between the pressed together 180 degree bent over parts of said foundation member.

6. The improvement in a pocket part for a vehicle door as claimed in claim 5 in which one of said vinyl wraps extends upwardly over the front face of the pocket part and then downwardly over the backside thereof and in which the other of said vinyl wraps extends downwardly over the front face of the pocket part and then both upwardly and inwardly over the backside thereof so that perimeter portions thereof cover the back face of said U-shaped frame over the elongate base and upstanding arms thereof.

7. In a pocket part for a vehicle door constructed to be affixed to the interior structure of such door to form a vehicle door pocket, the improvement comprising an elongate metal strap adapted to slide lengthwise inside of said pocket part, a pair of oppositely directed keyhole slots in the opposite ends of said strap, each keyhole slot having a circular portion and a straight portion, the two circular portions being disposed inboard of the two straight portions.

8. In a pocket part for a vehicle door constructed to be affixed to the interior structure of such door to form a vehicle door pocket, the improvement comprising a one-piece integral metal fastener having a double head formed on an end thereof and a square cross-section shoulder formed on the shank thereof for holding fast thereon against rotation a metal retention clip, said square cross-section shoulder being formed on said shank immediately adjacent the inner head of the two heads forming said double head.

9. In a pocket part for a vehicle door constructed to be affixed to the interior structure of said door to form a vehicle door pocket, the improvement comprising a metal retention clip having a square cross-section aperture centrally formed therein and having four ears formed thereon at the four corners thereof, respectively, for snapping said retention clip on another object to hold said retention clip fast against rotation thereof.

10. In a pocket part for a vehicle door constructed to be affixed to the interior structure of such door to form a vehicle door pocket, the improvement comprising a metal fastener having a double head formed on an end thereof and a square cross-section shoulder formed on the shank thereof, and a metal retention clip held fast on said fastener, the retention clip having a square cross-section aperture centrally formed therein which mates with said shoulder to prevent rotation relative to said fastener.

11. The improvement in a pocket part as claimed in claim 10 further comprising said retention clip having four ears formed thereon at the four corners thereof, respectively, for snapping said retention clip on another object to hold both itself and said fastener fast against rotation.

12. The improvement in a pocket part as claimed in claim 10 further comprising a single elongate metal strap adapted to slide lengthwise inside of said pocket part, a pair of oppositely directed keyhole slots in the opposite ends of said strap, the slidable strap held on the fasteners by the slots therein being disposed, respectively, in the spaces between the two heads on each fastener.

13. The improvement in a pocket part as claimed in claim 12 further comprising a single elastic strap wrapped around the opposite ends of the slidable strap and having its ends held by the shanks, respectively, of the pair of fasteners, the elastic strap being in tension so as to maintain the slidable strap in compression, whereby, to maintain the upper edge of the pocket part biased against said interior door structure.

* * * * *